(12) United States Patent
Zhou

(10) Patent No.: US 11,968,959 B2
(45) Date of Patent: Apr. 30, 2024

(54) FOLDABLE PET BATHING TUB

(71) Applicant: Jie Zhou, Upland, CA (US)

(72) Inventor: Jie Zhou, Upland, CA (US)

( * ) Notice: Subject to any disclaimer, the term of this patent is extended or adjusted under 35 U.S.C. 154(b) by 225 days.

(21) Appl. No.: 17/555,857

(22) Filed: Dec. 20, 2021

(65) Prior Publication Data

US 2023/0189758 A1    Jun. 22, 2023

(51) Int. Cl.
*A01K 13/00* (2006.01)

(52) U.S. Cl.
CPC .................................. *A01K 13/001* (2013.01)

(58) Field of Classification Search
CPC ......... A01K 13/001; A61D 7/00; A61D 11/00
See application file for complete search history.

(56) References Cited

U.S. PATENT DOCUMENTS

| | | | | |
|---|---|---|---|---|
| 1,883,660 A * | 10/1932 | Feldman | ................ | A47K 3/074 |
| | | | | 4/572.1 |
| 2,700,776 A * | 2/1955 | Walters | .................. | A47K 3/074 |
| | | | | 4/572.1 |
| 2,719,306 A * | 10/1955 | Levitt | .................... | A47K 3/074 |
| | | | | 4/586 |
| 4,407,234 A | 10/1983 | Kleman | | |
| 4,932,086 A * | 6/1990 | Bergkvist | ............... | A47D 5/006 |
| | | | | 5/655 |
| 5,367,724 A * | 11/1994 | Coccagna | ................ | A47K 3/12 |
| | | | | 4/573.1 |
| 5,488,926 A * | 2/1996 | Hunt | ........................ | A61D 3/00 |
| | | | | 108/133 |
| 5,662,069 A * | 9/1997 | Smith | .................. | A01K 13/001 |
| | | | | 119/673 |
| 5,711,252 A | 1/1998 | Brandolino | | |
| 5,974,601 A | 11/1999 | Drane | | |
| 7,921,812 B1 | 4/2011 | Carrillo | | |
| 10,701,903 B1 * | 7/2020 | Cesta | ..................... | G08B 21/22 |
| D940,284 S * | 1/2022 | Mu | ............................. | D23/277 |
| 2003/0015147 A1 * | 1/2003 | Taylor | .................... | A01K 13/00 |
| | | | | 119/600 |
| 2009/0223464 A1 * | 9/2009 | Dumenil | .............. | A01K 13/001 |
| | | | | 119/676 |
| 2013/0213318 A1 * | 8/2013 | Katz | .................... | A01K 13/001 |
| | | | | 119/754 |
| 2016/0066541 A1 * | 3/2016 | Storum | .................. | A01K 15/04 |
| | | | | 119/756 |
| 2019/0375539 A1 * | 12/2019 | Mu | ...................... | B65D 21/086 |
| 2023/0117341 A1 * | 4/2023 | Mu | ........................ | A01K 1/035 |
| | | | | 119/600 |

* cited by examiner

Primary Examiner — Ebony E Evans
(74) Attorney, Agent, or Firm — Clement Cheng

(57) ABSTRACT

A foldable pet bathing tub has a collapsible tub that includes vertical sidewalls and a lower wall. A frame supports the collapsible tub and has a rigid upper frame that circumscribes an upper edge of the collapsible tub. A tub support frame supports the lower wall. A right swivel leg is swivel connected to the upper frame at a right swivel joint. The right swivel leg is configured to rotate about the upper frame. A left swivel leg is swivel connected to the upper frame at a left swivel joint. The left swivel and is configured to rotate about the upper frame. The right swivel leg and the left swivel leg swivel between a deployed mode where they are parallel to each other and oriented in the same direction, and a folded mode where they are also parallel to each other but oriented in opposite directions.

16 Claims, 3 Drawing Sheets

FOLDABLE PET BATHING TUB

FIELD OF THE INVENTION

The present invention is in the field of pet bathing tubs.

DISCUSSION OF RELATED ART

A variety of different pet bathing tubs are described in the prior art.

For example, in U.S. Pat. No. 7,921,812 entitled Portable Animal Bathing Apparatus by inventor Lorraine M. Carrillo, published Apr. 12, 2011 has an abstract that discloses, "A portable animal bathing apparatus (10) that comprises an enclosure (12) having a front panel (14), a rear panel (16), a right panel (18), a left panel (20), a bottom panel (22), an upper edge (24) and a lower edge (26). The enclosure (12) is preferably rectangular shaped an extending downward from each corner of the enclosure is a preferably height adjustable leg (68). A curtain (104) extends upward for the upper edge (24) of the enclosure (12). The curtain (104) is supported by four curtain posts (112). A combination swing ramp and cover (116) extends downward from the right panel (18) of the enclosure (12). The swing ramp and cover (116) allows an animal to be walked up and into the enclosure (12), and also functions as a cover for the enclosure (12) when not in use. A water pump (136) and water reservoir (140) are located in the enclosure (12), within a protective enclosure (144). A shower hose (152) is attached to the water pump (136) to provide directional water spraying during an animal bathing session"

Also for example, in U.S. Pat. No. 4,407,234 entitled Portable and Adjustable Apparatus For Cleaning, Grooming and Otherwise Treating Dogs and Other Animals of Similar Size by inventor Joseph F. Kleman, published Oct. 4, 1983 the abstract discloses, "A durable and relatively inexpensive readily portable and easily adjusted apparatus for cleaning, grooming, and otherwise treating dogs and other animals of similar size, comprises a combination of simple and inexpensive elements which may be readily and easily utilized; and the operation of which is such as to eliminate or very materially reduce excitement or traumatization of the animal; while at the same time requiring but a minimum of effort and inconvenience on the part of the operator and without any leakage of water onto the surrounding environment or the attire of the operator."

Also for example, in U.S. Pat. No. 5,711,252 entitled Pet Bath Apparatus by inventor Lanae Brandolino, published Jan. 27, 1998 the abstract discloses, "A pet bath apparatus includes a sloped floor unit which includes an elevated portion, a lower portion, and a drain portion located in the lower portion. A set of support legs project downward from the sloped floor unit. A pair of end wall units and a pair of side wall units are supported by the sloped floor unit. Connector assemblies are supported by the wall units and selectively connect adjacent wall units together. The sloped floor unit includes an elevated mid-portion and two lower portions sloping downward from the elevated mid-portion. The drain portion includes a plurality of drain apertures. The sloped floor unit includes a pair of support ridges projecting upward from side portions of the sloped floor unit, and each side wall unit includes a flange portion projecting outward from an inside side wall surface and in engagement with a support ridge. Each side wall unit includes a pair of alignment-pin-receiving elements which project outward from end portions of the inside side wall surfaces. Each end wall unit includes a pair of alignment pins which project outward from inside wall surfaces of the end wall units. Each connector assembly includes elastic cords which are connected to cord receivers on each of the side wall units. A screen assembly, to catch pet hair, can be placed over drain apertures of the sloped floor unit. A riser assembly can be placed under the sloped floor unit and receive the support legs."

In U.S. Pat. No. 5,974,601 entitled Small Animal Washing Container by inventor Mark R. Drane, published Nov. 2, 1999 the abstract discloses, "A small plastic animal container assembly or kit of parts for bathing small pets in a home bathtub or shower stall. The container assembly includes foldable legs to raise it to a height that allows a person to stand while administering the bath. The container walls are bowed outward in the middle providing more room for a small animal to easily turn around, yet provide confinement for an animal of predetermined size. The bottom of the container has a centralized drain and pet hair filter channel which runs lengthwise along the entire bottom of the container and includes a sufficient number of strategically placed drain holes to provide for continuous water removal and filtering of loose pet hair. Pockets are integrally molded into the four corners of the container to provide a means to hold pet bathing accessories such as shampoo, a brush, a sponge, etc. A clip is built into or attached to one end of the container to provide a means to hold a variety of sizes of handles used on shower water spray heads. The spray heads are connected to a flexible hose and are part of the bathtub or shower stall fixtures found in many existing bathrooms. The clip provides a place to hold the handle of the spray head in a downward facing position so that the water is directed toward the bottom of the bathtub or shower stall, thus negating the need to turn the water on and off each time you need to apply water to the pet. Texture on the bottom surface of the container provides a non-skid surface for the pet to stand. Slots are formed in the rim of the container to which a retaining strap can be attached to the collar of the animal. The support legs have non-skid feet or shoes to prevent damage and slippage on the bottom surface of the bathtub or shower stall. The legs of the container can be un-snapped from the bottom of the container and folded flat for storage."

SUMMARY OF THE INVENTION

A foldable pet bathing tub has a collapsible tub. The collapsible tub includes vertical sidewalls and a lower wall. A frame supports the collapsible tub. The frame includes an upper frame. The upper frame is rigid and circumscribes an upper edge of the collapsible tub. The frame further includes a tub support frame that supports the lower wall.

The tub also includes a right swivel leg, and a left swivel leg. The right swivel leg is swivel connected to the upper frame at a right swivel joint. The right swivel leg is configured to rotate about the upper frame. The left swivel leg is swivel connected to the upper frame at a left swivel joint. The left swivel and is configured to rotate about the upper frame. The right swivel leg and the left swivel leg swivel between a deployed mode where they are parallel to each other and oriented in the same direction, and a folded mode where they are also parallel to each other but oriented in opposite directions. The tub support frame connects between the right swivel leg and the left swivel leg.

The collapsible tub has support flaps that extend from the vertical sidewalls to form sleeves that receive the upper frame. The right swivel leg has a right lower support having a front lower right foot and a rear lower right foot. The left swivel leg has a left lower support with a front lower left foot and a rear lower left foot. The the right swivel joint and the left swivel joint both have concentric tube structures. The right swivel joint overlies the upper frame at a right side of the upper frame and the left swivel joint overlies the upper frame at a left side of the upper frame. An outlet connection is formed on the lower wall. The outlet connection is adapted to connect to the drain hose.

The foldable pet bathing tub has a vertically adjustable harness frame. The harness frame fits to a harness frame socket formed on either the right swivel leg or the left swivel leg. The harness frame suspends a first harness and a second harness. The harness frame has a vertical section extending upwardly from the harness frame socket and a horizontal section extending over the tub. A lower crossbeam connects the left swivel leg to the right swivel leg.

The following callout list of elements can be a useful guide in referencing the element numbers of the drawings.

20 Frame
21 Right Swivel Leg
22 Left Swivel Leg
23 Right Lower Support
24 Left Lower Support
25 Front Lower Right Foot
26 Rear Lower Right Foot
27 Front Lower Left Foot
28 Rear Lower Left Foot
29 Lower Cross Beam
30 Tub
31 Tub Supportt Frame
32 Front Right Support Flap
33 Front Left Support Flap
34 Front Pocket
35 Front Tub Wall
36 Right Tub Wall
37 Left Tub Wall
38 Lower Tub Wall
39 Flap Connector
40 Drain Hose
41 Corrugation
42 Outlet Connection
43 Hose Clamp
50 Upper Frame
51 Right Swivel Joint
52 Left Swivel Joint
53 Harness Frame
54 Harness Frame Socket
54 First Harness Eyelet
56 Second Harness Eyelet
57 First Harness
58 Second Harness
59 Harness Frame Adjustment Knob
61 Rear Pocket
62 Rear Tub Wall
63 Tubular Collar
71 Peripheral Frame Section
72 Central Frame Section
73 Tub Support Frame Connectors
74 Lower Cross Beam Connectors

DETAILED DESCRIPTION OF THE PREFERRED EMBODIMENT

Figure 1:
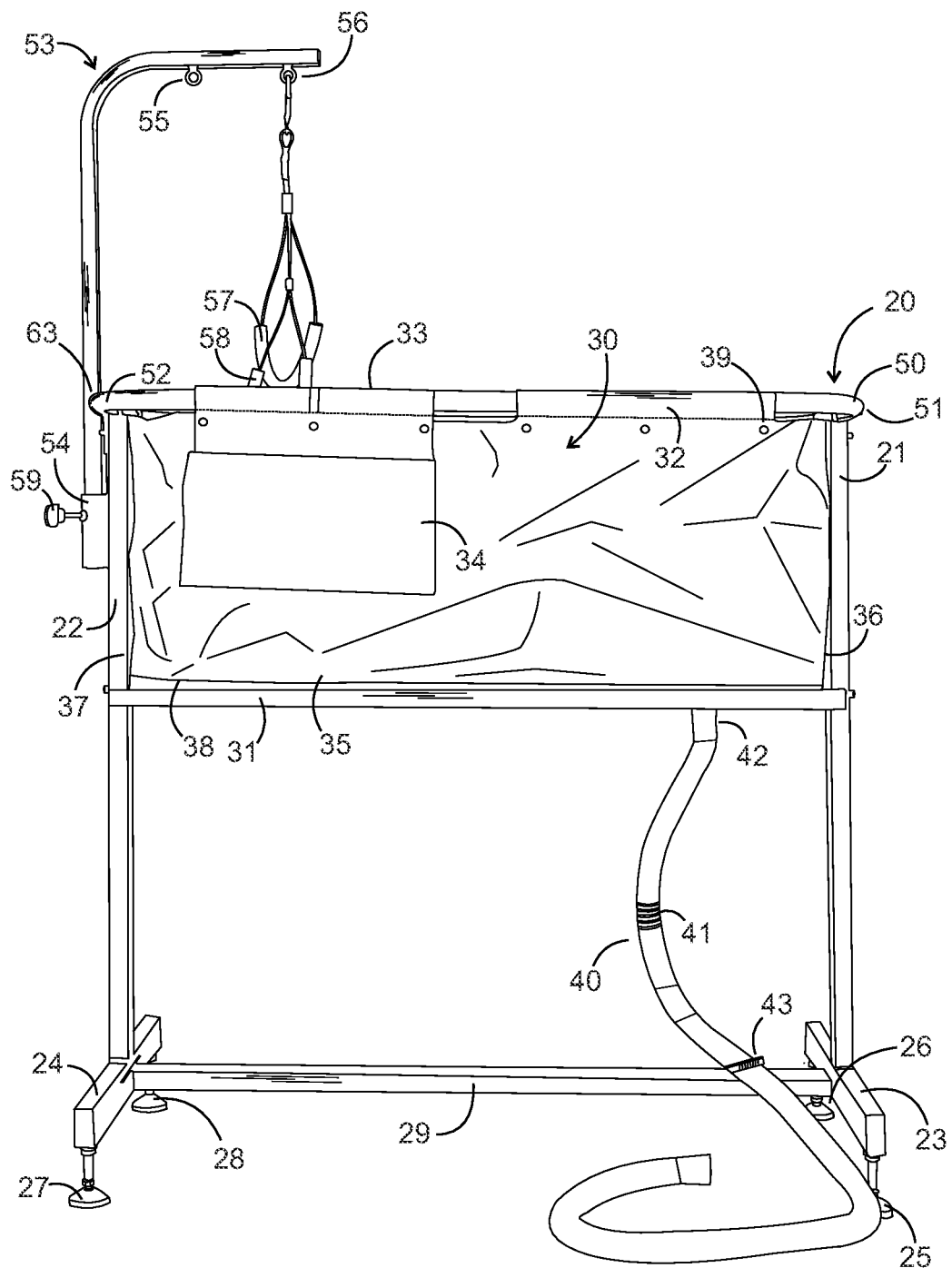
FIG. 1 is a front view diagram showing the entire system.

As seen in FIG. 1, the frame 20 supports a tub 30. The tub is open at the top and collapsible as it is made of flexible plastic sheeting. The tub 30 is supported by the upper frame 50 of the frame 20 has a drain hose 40 extending downwardly from the tub 30. A right swivel leg 21 and a left swivel leg 22 support the tub 30. The right swivel leg 21 has a right lower support 23 perpendicular to the right swivel leg 21. The left swivel leg 22 has a left lower support 24 perpendicular to the left swivel leg 22. The right lower support 23 has a front lower right foot 25 and a rear lower right foot 26. The left lower support 24 has a front lower left foot 27, and a rear lower left foot 28.

The lower crossbeam 29 connects the right lower support 23 to the left lower support 24. The tub support frame 31 supports the lower surface of the tub 30. The top 30 has a plurality of flaps which preferably include at least a front right support flap 32 and a front left support flap 33. The flaps may include pockets such as a front pocket 34. The The tub is a flexible sheet material and is preferably formed with a front tub wall 35 connected to a right tub wall 36 and a left tub wall 37. The tub walls are preferably connected to the lower tub wall 38. The lower tub wall 38 is horizontal and preferably thermally laminated at its periphery to the vertical tub walls which include the front tub wall 35, the right tub wall 36, the left tub wall 37, and the rear tub wall 62.

The upper edge of the vertical tub walls that have flaps, are connected to the upper frame 50 at flap connectors 39. The flap connectors 39 are preferably formed as a pair of grommets which can be retained by screws for releasable connection.

Additionally, a drain hose 40 having corrugation 41 can connect to an outlet connection 42 formed on the lower tub wall 38. A hose clamp 43 may further retain the drain hose 40 to the outlet connection 42. The outlet connection 42 can be formed as a rubber flange.

The upper frame 50 is preferably rigid and has a right swivel joint 51 and a left swivel joint 52. The right swivel joint is preferably formed as a tubular collar that fits over the tube of the upper frame 50. The frame members such as the upper frame 50 are preferably powder coated. The powder coating provides a roughness so that the tubular collar 63 has a swivel connection but with some dampening resistance to rotation.

A frame harness 53 fits into a harness frame socket 54. The harness frame socket 54 is preferably welded to the right swivel leg 21. The harness frame adjustment knob 59 can be loosened for adjusting a height of the frame harness 53. The frame harness 53 fits telescopically within the harness frame socket 54. The frame harness 53 preferably includes a first harness eyelet 55 and a second harness eyelet 56. A first harness 57 and a second harness 58 can be connected to either the first harness eyelet 55 or the second harness eyelet 56.

Figure 2:
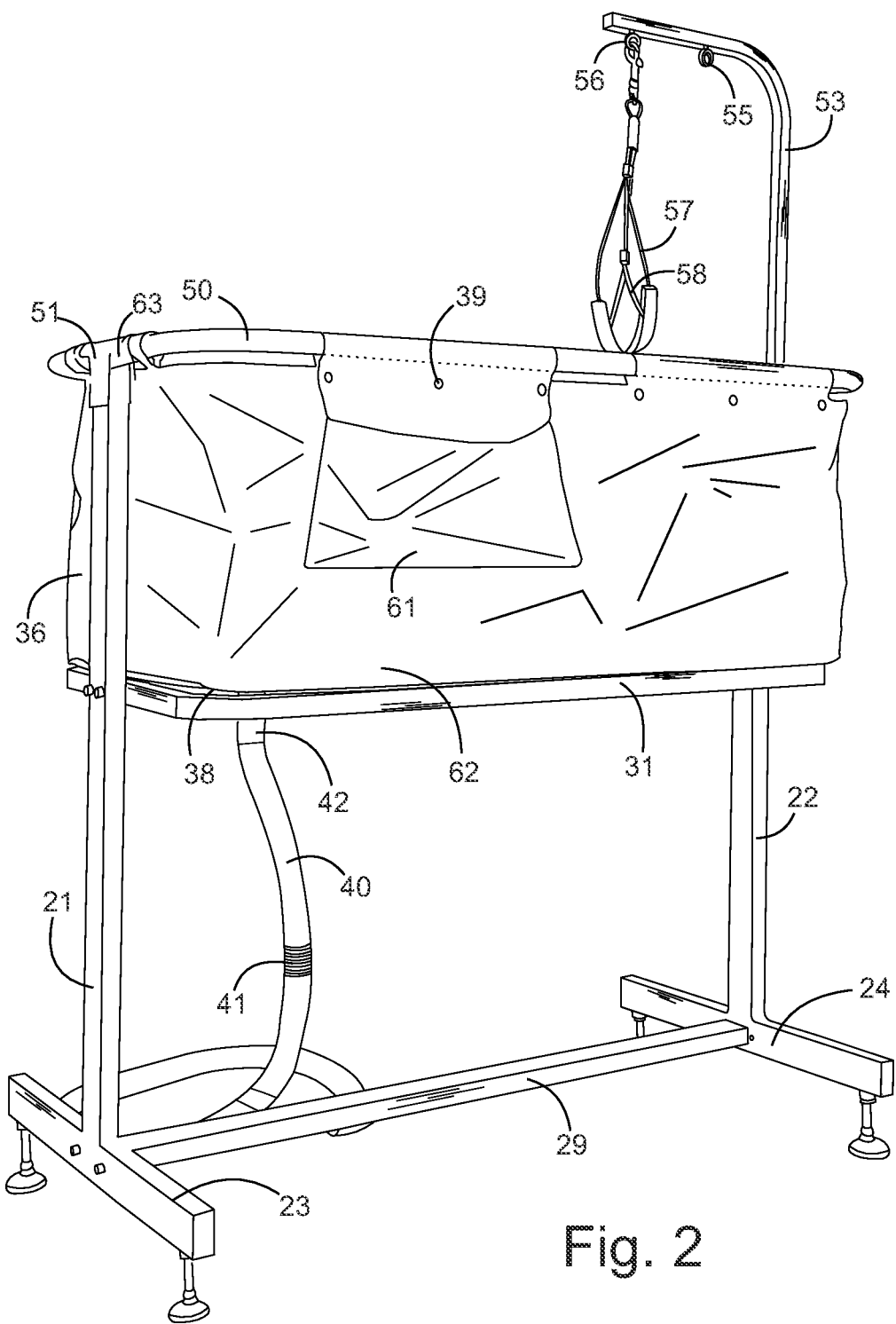
FIG. 2 is a rear view diagram.

As seen in FIG. 2, the right swivel leg 21, and the left swivel leg 22 are bolted to the lower crossbeam 29 and the tub support frame 31. The upper frame 50 is preferably a tubular shape to receive the tubular collar 63 of the right swivel joint 51, or the left swivel joint 52. The tubular collar 63 can be made as a T connector that has a lower socket for receiving the main shaft of the swivel leg. The rear side of the tub preferably has a rear pocket 61 overlying the rear tub wall 62. The right lower support 23, and the left lower support 24 are lower portions of the right swivel leg 21, and the left swivel leg 22 and rigidly connected such that they swivel together.

The vertical wall sections which include the right tub wall 36, is preferably continuous with the rear tub wall 62, which is continuous with the left tub wall, which is continuous with the front tub wall. Preferably, the vertical wall sections have only a single seam. The vertical wall sections collapse when not in use to a flat folded configuration. The flap connectors 39 are preferably a pair of grommets with a screw connection between the pair of grommets. The flaps preferably layover the top of the upper frame 50 such that the flap edge is on the inside of the tub.

The drain hose 40 is preferably corrugated with corrugations 41 that allow flexibility. The outlet connection 42 of the tub, is preferably semirigid to accommodate the flexible drain hose 40.

The harness frame 53 is preferably vertically adjustable, and can also be horizontally adjustable such as when a user changes the connection of the first harness 57 and the second harness 58 between the first harness eyelet 55 and a second harness eyelet 56. The user can connect the first harness 57 to the first harness eyelet 55 and a first mode, and the user can connect the second harness 58 to the second harness eyelet 56 and a second mode. The first mode can be adapted for a larger dog, and the second mode can be adapted for a smaller dog. The harness frame 53 is preferably a rigid square tubular member with a horizontal section extending over the tub, and a vertical section adjustably mounting to one of the swivel legs.

Figure 3:
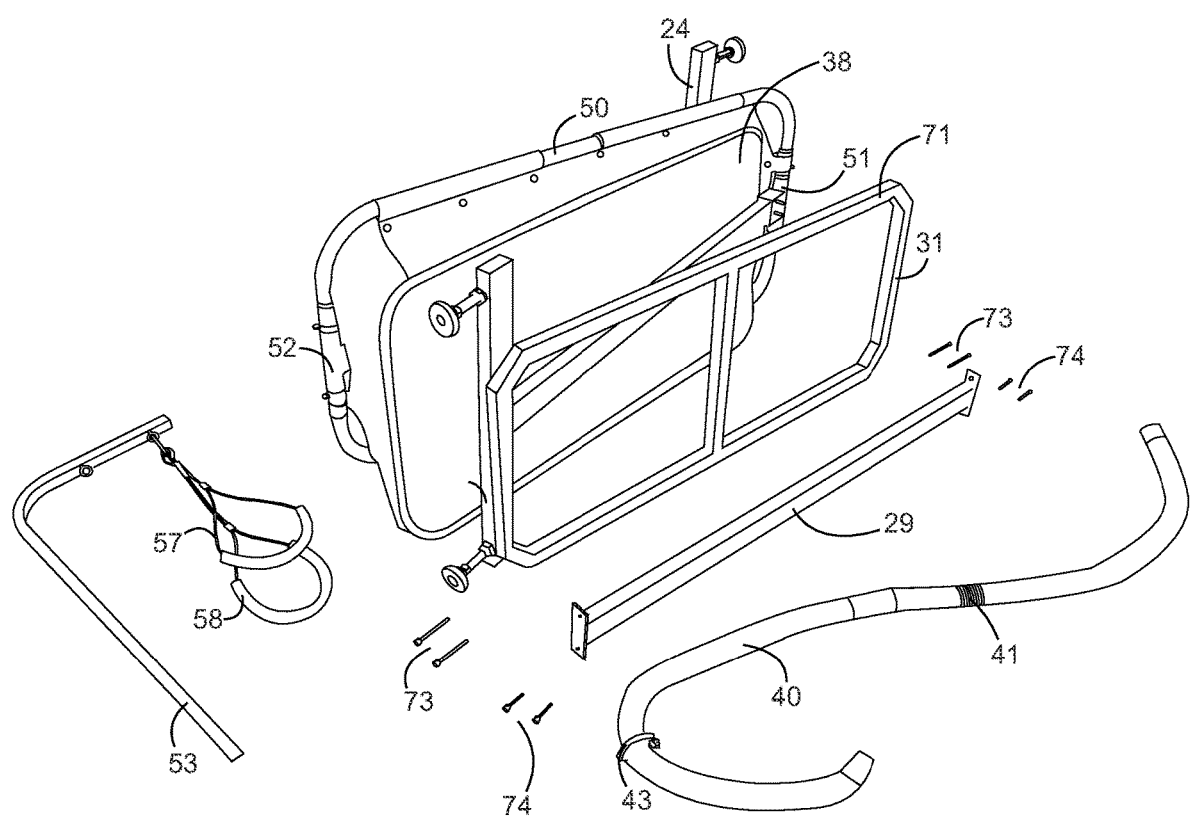
FIG. 3 is an exploded view of the present invention.

As seen in FIG. 3, the tub support frame 31 further includes a peripheral frame section 71 with a reinforcing central frame section 72. The peripheral frame section 71 matches the profile of the lower tub wall 38, and the lower tub wall 38 is reinforced with a panel to provide sufficient rigidity and support. The panel can be thermally laminated to the lower tub wall 38 such that the lower tub wall 38 has multiple layers with a central supporting plank laminated between the pair of skin layers that are thermally laminated to the vertical walls.

The tub support frame connectors 73 connect the peripheral frame section 71 to the folding legs, and are removed when the foldable pet bathing tub is converted from the deployed position to the folded position. The lower crossbeam connectors 74 connect the lower crossbeam 29 to the folding legs. The lower crossbeam connectors 74 are removed when the foldable pet bathing tub is converted from the deployed position to the folded position. The harness frame 53 is removed from its socket along with the first harness 57 and the second harness 58 when the foldable pet bathing tub is converted from the deployed position to the folded position.

The right lower support 23, and the left lower support 24 rotate with the folding legs. The folding legs rotate in the same orientation when the foldable pet bathing tub is converted from the deployed position to the folded position. The right leg can fold underneath the tub in a clockwise rotation while the left leg folds over the top of the tub in a clockwise direction. Alternatively, the right leg could fold over the top of the tub in a counterclockwise direction while the left leg folds underneath the tub in a counterclockwise direction. The frame connectors can be integrated with the lower crossbeam 29 and the top support frame 31. So that they are not loose during conversion to the folded position. The lower tub wall 38 forms a flat area for the folding leg to lay parallel with. As seen in the figures, the right folding leg rotates to abut and stow parallel to the lower tub wall 38. The drain hose 40, having corrugations 41 and a hose clamp 43, can be rolled up and held in the tub. The upper frame 50 remains rigid and parallel to the peripheral frame section 71 which is also rigid. The right swivel joint 51 and the left swivel joint 52 have a larger diameter than the upper frame 50 so as to retain the upper frame 50 and provide a rotating joint. The right swivel joint 51 and the left swivel joint 52 can be in telescopic orientation to the upper frame 50. The telescopic orientation can be fixed with bolts on either side of the swivel joints to prevent the swivel joints from walking or slipping out.

The invention claimed is:

1. A foldable pet bathing tub comprising:
   a. a collapsible tub, wherein the collapsible tub includes vertical sidewalls and a lower wall;
   b. a frame supporting the collapsible tub, wherein the frame includes an upper frame, wherein the upper frame is rigid and circumscribing an upper edge of the collapsible tub, wherein the frame further includes a tub support frame that supports the lower wall; and
   c. a right swivel leg, and a left swivel leg, wherein the right swivel leg swivels relative to the upper frame, wherein the right swivel leg is connected to the upper frame at a right swivel joint, wherein the right swivel leg is configured to rotate about the upper frame, wherein the left swivel leg swivels relative to the upper frame, wherein the left swivel leg is connected to the upper frame at a left swivel joint, wherein the left swivel is configured to rotate about the upper frame, wherein the right swivel leg and the left swivel leg swivel between a deployed mode where they are parallel to each other and oriented in the same direction, and a folded mode where they are also parallel to each other but oriented in opposite directions, wherein the tub support frame connects between the right swivel leg and the left swivel leg.

2. The foldable pet bathing tub of claim 1, wherein the collapsible tub further includes support flaps, wherein the support flaps extend from the vertical sidewalls to form sleeves that receive the upper frame.

3. The foldable pet bathing tub of claim 1, wherein the right swivel leg further includes a right lower support having a front lower right foot and a rear lower right foot, wherein the left swivel leg further includes a left lower support having a front lower left foot and a rear lower left foot.

4. The foldable pet bathing tub of claim 1, wherein the right swivel joint and the left swivel joint both have concentric tube structures, wherein the right swivel joint overlies the upper frame at a right side of the upper frame, wherein the left swivel joint overlies the upper frame at a left side of the upper frame.

5. The foldable pet bathing tub of claim 1, further including an outlet connection formed on the lower wall, and further including a drain hose, wherein the outlet connection is adapted to connect to the drain hose.

6. The foldable pet bathing tub of claim 1, further including a harness frame, wherein the harness frame fits to a harness frame socket formed on either the right swivel leg or the left swivel leg, wherein the harness frame suspends a first harness and a second harness, wherein the harness frame has a vertical section extending upwardly from the harness frame socket and a horizontal section extending over the tub.

7. The foldable pet bathing tub of claim 1, further including a lower crossbeam connecting the left swivel leg to the right swivel leg.

8. The foldable pet bathing tub of claim 7, wherein the collapsible tub further includes support flaps, wherein the support flaps extend from the vertical sidewalls to form sleeves that receive the upper frame.

9. The foldable pet bathing tub of claim 7, wherein the right swivel leg further includes a right lower support having a front lower right foot and a rear lower right foot, wherein the left swivel leg further includes a left lower support having a front lower left foot and a rear lower left foot.

10. The foldable pet bathing tub of claim 7, wherein the right swivel joint and the left swivel joint both have concentric tube structures, wherein the right swivel joint overlies the upper frame at a right side of the upper frame, wherein the left swivel joint overlies the upper frame at a left side of the upper frame.

11. The foldable pet bathing tub of claim 7, further including an outlet connection formed on the lower wall, and further including a drain hose, wherein the outlet connection is adapted to connect to the drain hose.

12. The foldable pet bathing tub of claim 7, further including a harness frame, wherein the harness frame fits to a harness frame socket formed on either the right swivel leg or the left swivel leg, wherein the harness frame suspends a first harness and a second harness, wherein the harness frame has a vertical section extending upwardly from the harness frame socket and a horizontal section extending over the tub.

13. The foldable pet bathing tub of claim 12, wherein the collapsible tub further includes support flaps, wherein the support flaps extend from the vertical sidewalls to form sleeves that receive the upper frame.

14. The foldable pet bathing tub of claim 12, wherein the right swivel leg further includes a right lower support having a front lower right foot and a rear lower right foot, wherein the left swivel leg further includes a left lower support having a front lower left foot and a rear lower left foot.

15. The foldable pet bathing tub of claim 12, wherein the right swivel joint and the left swivel joint both have concentric tube structures, wherein the right swivel joint overlies the upper frame at a right side of the upper frame, wherein the left swivel joint overlies the upper frame at a left side of the upper frame.

16. The foldable pet bathing tub of claim 12, further including an outlet connection formed on the lower wall, and further including a drain hose, wherein the outlet connection is adapted to connect to the drain hose.

\* \* \* \* \*